(12) United States Patent
Kojima et al.

(10) Patent No.: US 7,750,932 B2
(45) Date of Patent: Jul. 6, 2010

(54) EXPOSING DEVICE AND IMAGE FORMING APPARATUS HAVING THE SAME

(75) Inventors: Takahiro Kojima, Mishima (JP); Masahiro Kodo, Numazu (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 12/201,998

(22) Filed: Aug. 29, 2008

(65) Prior Publication Data

US 2009/0067020 A1 Mar. 12, 2009

Related U.S. Application Data

(60) Provisional application No. 60/971,248, filed on Sep. 10, 2007, provisional application No. 60/980,361, filed on Oct. 16, 2007.

(51) Int. Cl.
*B41J 15/14* (2006.01)
*B41J 27/00* (2006.01)

(52) U.S. Cl. .................. 347/242; 347/257

(58) Field of Classification Search .................. 347/241, 347/242, 245, 256, 257, 263, 230
See application file for complete search history.

(56) References Cited

U.S. PATENT DOCUMENTS

| | | | |
|---|---|---|---|
| 6,700,687 B1 | 3/2004 | Itabashi et al. | |
| 7,048,394 B2* | 5/2006 | Takase et al. | 359/872 |
| 7,388,191 B2* | 6/2008 | Bang | 250/234 |
| 7,453,615 B2* | 11/2008 | Nakajima | 359/198.1 |
| 2007/0216966 A1* | 9/2007 | Ohsugi | 358/484 |

* cited by examiner

*Primary Examiner*—Hai C Pham
(74) *Attorney, Agent, or Firm*—Patterson & Sheridan, LLP

(57) ABSTRACT

A light source, a polygon mirror mechanism, a deflection lens, and a mirror unit are housed in a casing. The mirror unit includes a base member of metal fixed to the casing and a mirror supporting plate attached to the base member. The mirror supporting plate is formed by a metal flat plate and includes a mirror supporting section. A holder member is attached to the mirror supporting section. An end of the mirror is held in the holder member by a spring member. The holder member is rotatable around an axis of the mirror. When the holder member is rotated, an angle of the mirror changes. After the angle of the mirror is adjusted, the holder member is fixed to the mirror supporting section by a fixing member.

28 Claims, 12 Drawing Sheets

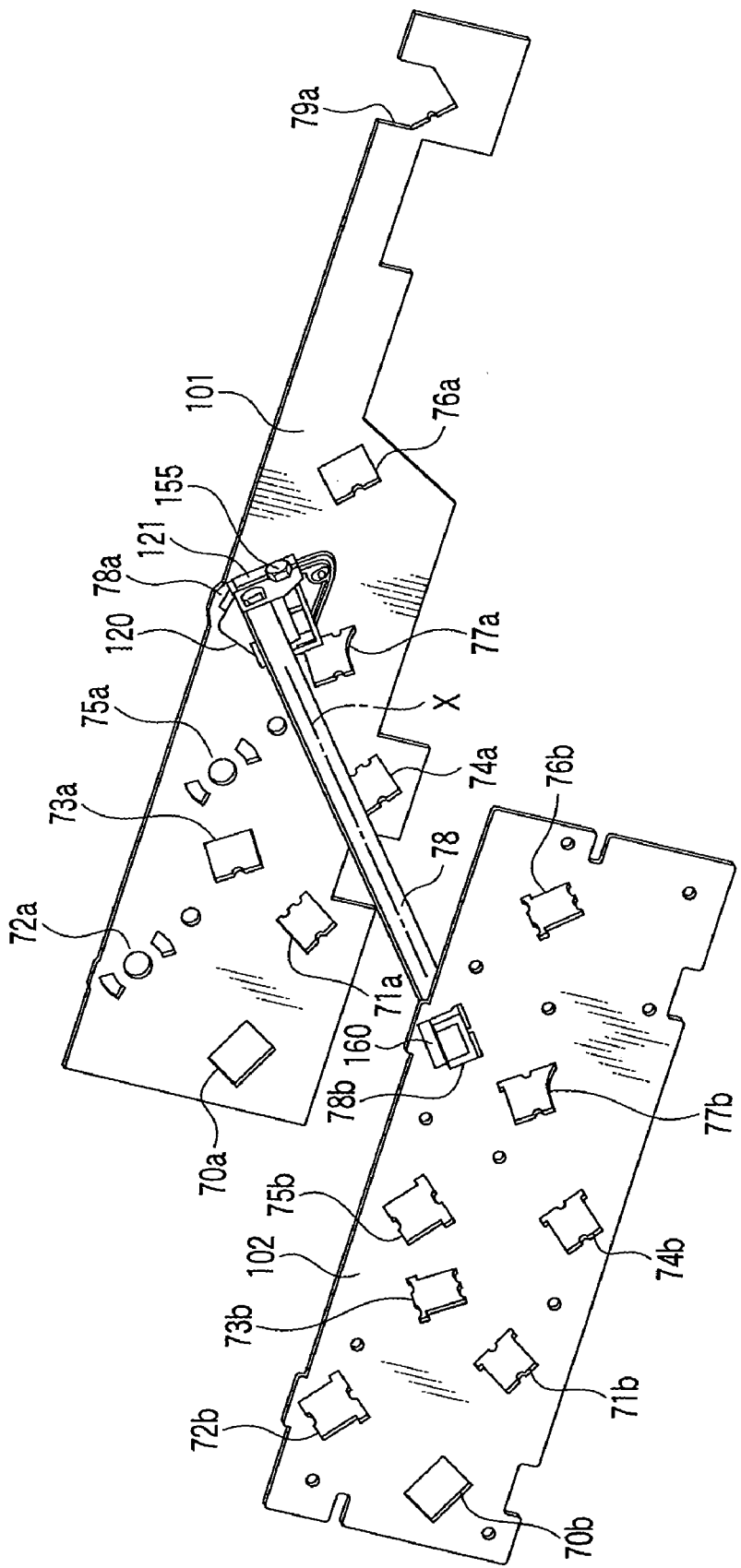
F I G. 5

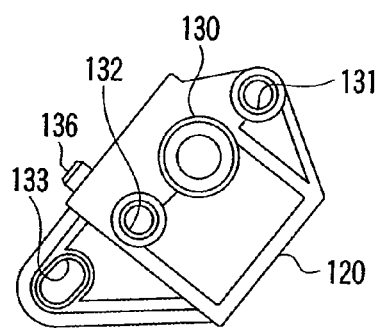
F I G. 9
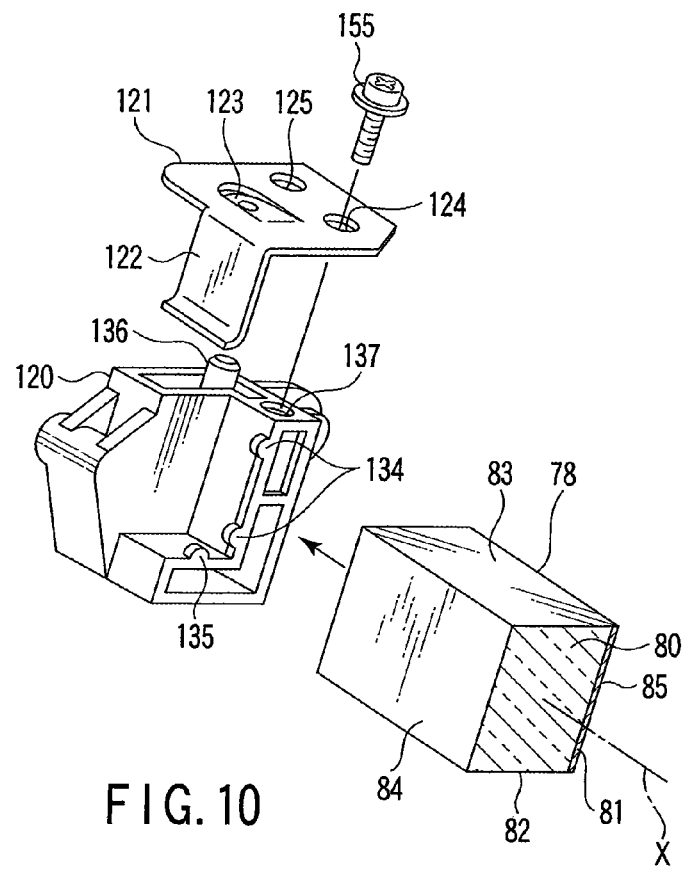
F I G. 10
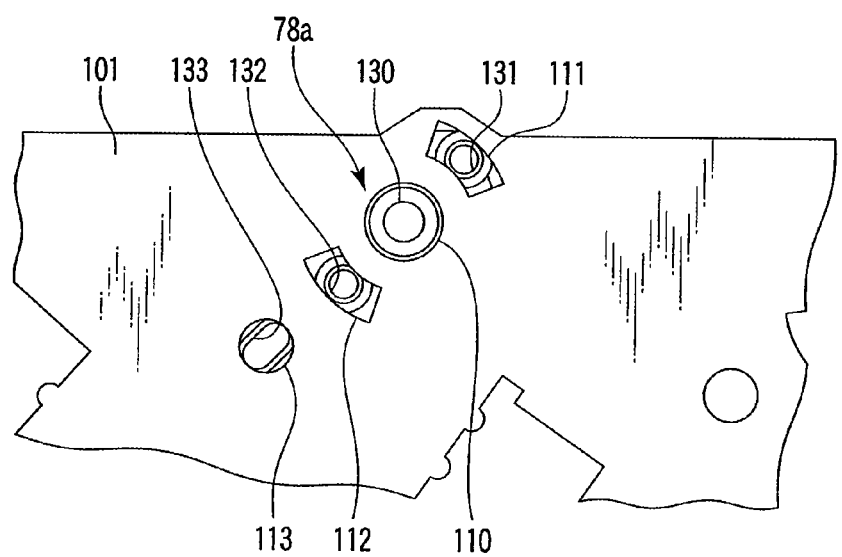
F I G. 11

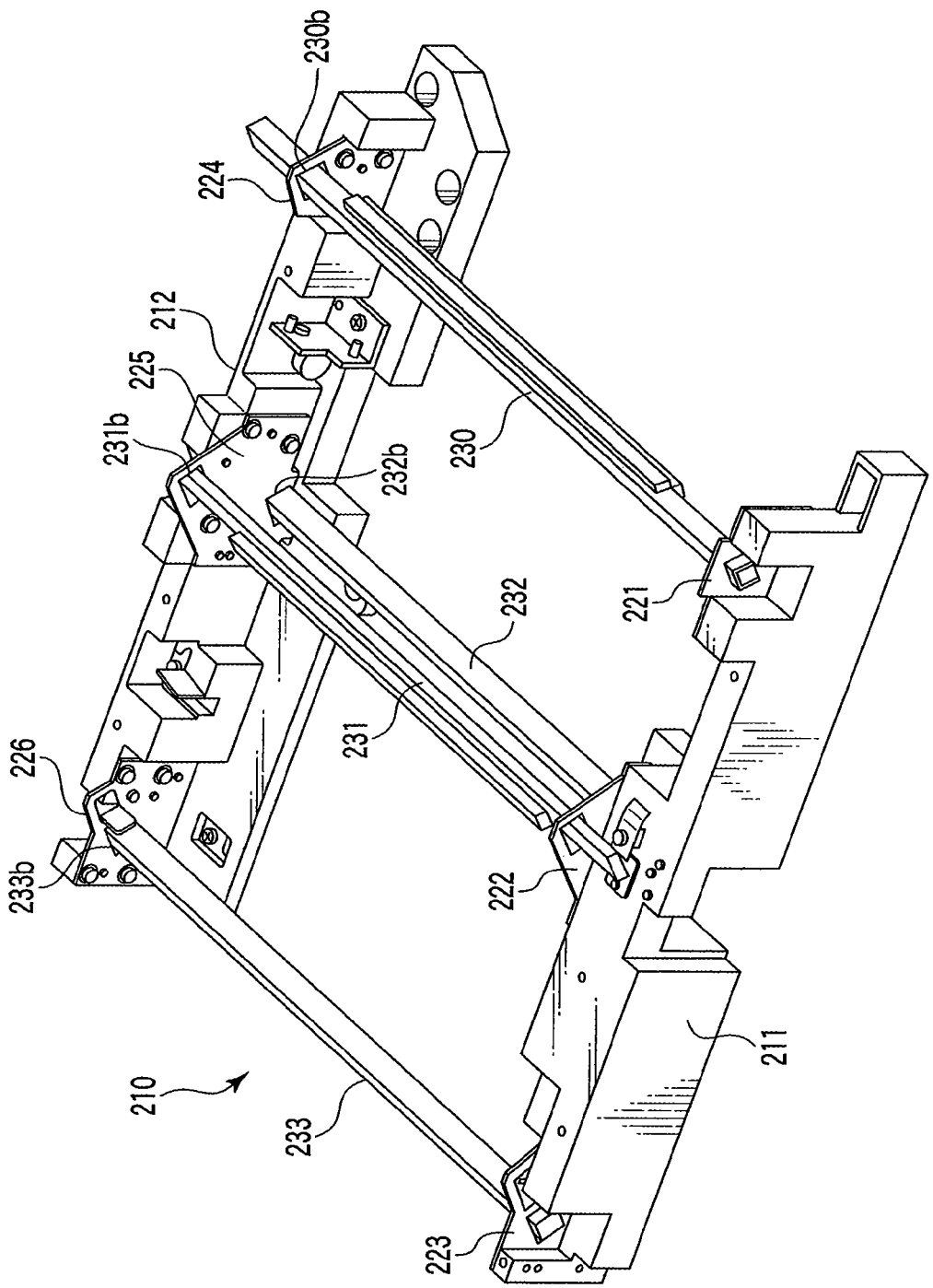
F I G. 15

EXPOSING DEVICE AND IMAGE FORMING APPARATUS HAVING THE SAME

CROSS-REFERENCE TO RELATED APPLICATIONS

This application is based upon and claims the benefit of priority from the prior U.S. Provisional Applications No. 60/971,248, filed Sep. 10, 2007 and No. 60/980,361, filed Oct. 16, 2007, the entire contents of which are incorporated herein by reference.

TECHNICAL FIELD

The present invention relates to an exposing device used in image forming apparatuses such as a copying machine, a printer, and a facsimile and an image forming apparatus including the exposing device.

BACKGROUND

For example, an image forming apparatus such as a color copying machine or a printer includes an exposing device. The exposing device includes a laser diode as a light source, a polygon mirror, a deflection lens (an fθ lens), and a reflection mirror. The exposing device may be referred to as a laser scanning unit or an optical scanning device. For example, as disclosed in U.S. Pat. No. 6,700,687 B1, a light source, a polygon mirror, a deflection lens, a reflection mirror, and the like are housed in a casing. A laser beam emitted from the light source is transmitted through the deflection lens via the polygon mirror and reflected by the reflection mirror to travel to a photoconductive drum.

The reflection mirror has a body square-bar-shaped in section and a reflection layer formed by depositing aluminum on the body. The mirror has a first surface on which the reflection layer is formed, second and third surfaces perpendicular to the first surface, and a fourth surface on the opposite side of the reflection layer. One end in an axial direction (a longitudinal direction) of the mirror is supported by one mirror supporting section provided in the casing. The other end in the axial direction of the mirror is supported by the other mirror supporting section provided in the casing. The exposing device of this type needs to reflect the laser beam at a predetermined angle with respect to the photoconductive drum. Therefore, the exposing device includes an adjusting mechanism for adjusting an angle of the mirror.

For example, the exposing device in the past, one mirror supporting section for supporting one end of the mirror has a positioning protrusion that comes into contact with the first surface of the mirror and an adjusting screw provided beside the positioning protrusion. A distal end of the adjusting screw is in contact with the first surface. A first flat spring is in contact with the fourth surface of the mirror with elastic energy stored therein. The first flat spring urges an end of the mirror toward the positioning protrusion. A positioning section that comes into contact with the second surface of the mirror is provided in one mirror supporting section. A second flat spring is in contact with the third surface of the mirror with elastic energy stored therein. The second flat spring urges one end of the mirror toward the positioning section. The other end of the mirror is elastically supported by a flat spring and a positioning protrusion provided in the other mirror supporting section.

To adjust an angle of the mirror, a projecting amount of the adjusting screw with respect to the mirror is changed by rotating the adjusting screw. For example, when the projecting amount of the adjusting screw is increased, while bending of the first flat spring increases, the mirror rotates in a first direction with the respective positioning protrusions as fulcrums. When the projecting amount of the adjusting screw is decreased, the mirror rotates in a second direction with the positioning protrusions as fulcrums with the repulsion of the first flat spring.

In the adjusting mechanism in the past, it is difficult to keep the balance of loads between the flat springs and the adjusting screw. For example, if the repulsion of the flat spring is too strong, when the projecting amount of the adjusting screw is increased, force larger than necessary force is applied to the mirror. This causes breakage of the mirror and shift of a position of the mirror from a predetermined position. Conversely, if the repulsion of the flat spring is too weak, when the projecting amount of the adjusting screw is reduced, the flat spring cannot push back the mirror. Therefore, the mirror cannot be rotated in a desired direction. Further, if the repulsion of the flat spring is weak, for example, a position of the mirror is not stabilized and the mirror moves when impact is applied to the mirror. In particular, when "permanent set in fatigue" due to aged deterioration of the flat spring is taken into account, it is difficult to properly keep the balance of loads between the repulsion of the flat spring and the adjusting screw.

Both the ends of the mirror are supported by a supporting section of the casing of the exposing device. Besides the mirror, a light source, a polygon mirror, a polygon motors a motor driver, and the like are housed in the casing. These act as heat generation sources during the operation of the exposing device. The casing of the exposing device may be affected by heat generated from peripheral apparatuses.

A casing of synthetic resin can be easily molded in a desired shape, light in weight, and low in cost compared with a casing of metal. However, the casing of synthetic resin has small thermal conductivity compared with the casing of metal. Therefore, a thermal expansion amount near a mirror supporting section close to a heat source and a thermal expansion amount near a mirror supporting section distant from the heat source may be different. This causes an adverse effect on a quality of an image in an exposing device including plural mirrors that are used in a color copying machine.

For example, in a mirror supporting section in a position close to a light source, since a thermal expansion amount is large, positional deviation of a mirror is large. An amount of shift of a beam reflected by the mirror is large. On the other hand, in a mirror supporting section in a position distant from the light source, since a thermal expansion amount is small, positional deviation of a mirror is small. An amount of shift of a beam reflected by the mirror is small. As a result, the amount of shift of the beams is different for each of the mirrors. This causes color drift on a photoconductive member. In that case, adjustment work is necessary for measures against the color drift. Therefore, for example, printing is unfavorably interrupted.

If the casing is integrally molded by using a material having high thermal conductivity such as an aluminum alloy, the thermal expansion difference between the mirror supporting sections can be reduced. However, the casing of metal is high in cost compared with the casing of synthetic resin. As another measure, it is also conceivable to fix a press-formed sheet metal member to the casing of synthetic resin. This sheet metal member is formed in a predetermined shape by pressing a metal plate. A mirror supporting member is provided in the sheet metal member. However, in the sheet metal member in which a bent section and the like are formed by pressing, it is difficult to highly accurately form the mirror supporting section in terms of a position and a shape.

SUMMARY

The present invention provides an exposing device having a mirror supporting section that can accurately support a mirror in a predetermined position and an image forming apparatus including the exposing device.

An exposing device according to an aspect of the present invention includes:

a casing;

a mirror housed in the casing;

a base member fixed to the casing;

a mirror supporting plate that is attached to the base member and has a mirror supporting section configured to support an end of the mirror;

a holder member that is attached to the mirror supporting section of the mirror supporting plate and is rotatable around an axis of the mirror;

a spring member that is attached to the holder member and holds the end of the mirror; and a fixing member configured to fix the holder member to the mirror supporting plate.

With this configuration, it is possible to adjust an angle of the mirror by loosening the fixing member and rotating the holder member in a desired direction using an adjusting jig. Since elasticity of the spring member does not change even if the holder member rotates, it is possible to fix the end of the mirror to the holder member with fixed holding power.

An image forming apparatus according to another aspect of the present invention includes:

an image forming unit having a developing device; and an exposing device that outputs light toward a photoconductive member of the image forming unit, wherein the exposing device includes:

a casing of synthetic resin;

plural mirrors housed in the casing;

a pair of base members of metal fixed to the casing;

a first mirror supporting plate of metal that is attached to one base member of the pair of base members and has one mirror supporting section configured to support one end of the mirror; and a second mirror supporting plate of metal that is attached to the other base member and has the other mirror supporting section configured to support the other end of the mirror.

With this configuration, the mirrors are respectively supported by the mirror supporting plates attached to the base members made of metal having high thermal conductivity. Since the base members have large rigidity and are resistible against vibration, even if the casing is made of synthetic resin, it is possible to surely hold the mirrors. Since the base members of metal have high heat radiation properties and a large heat capacity, it is possible to equally transfer heat to the respective mirror supporting sections. Therefore, it is possible to reduce a thermal expansion difference between a mirror supporting section close to a heat source and a mirror supporting section distant from the heat source and prevent relative positions of the mirrors from shifting because of the thermal expansion difference. Since the mirror supporting sections are formed in simple-shaped mirror supporting plates formed by flat plates, it is possible to improve accuracy of relative positions and shapes of the respective mirror supporting sections.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a perspective view of the mirror and the mirror supporting plate of the exposing device shown in FIG. 2 viewed from the other side;

FIG. 9 is a side view of a holder member;

FIG. 10 is a perspective view of the holder member shown in FIG. 9 viewed from the opposite side;

FIG. 11 is a side view of a mirror supporting section shown in FIG. 4;

FIG. 15 is a perspective view of the mirror unit shown in FIG. 14 viewed from the other side.

DETAILED DESCRIPTION

A first embodiment of the present invention is explained below with reference to FIGS. 1 to 12.

Figure 1:
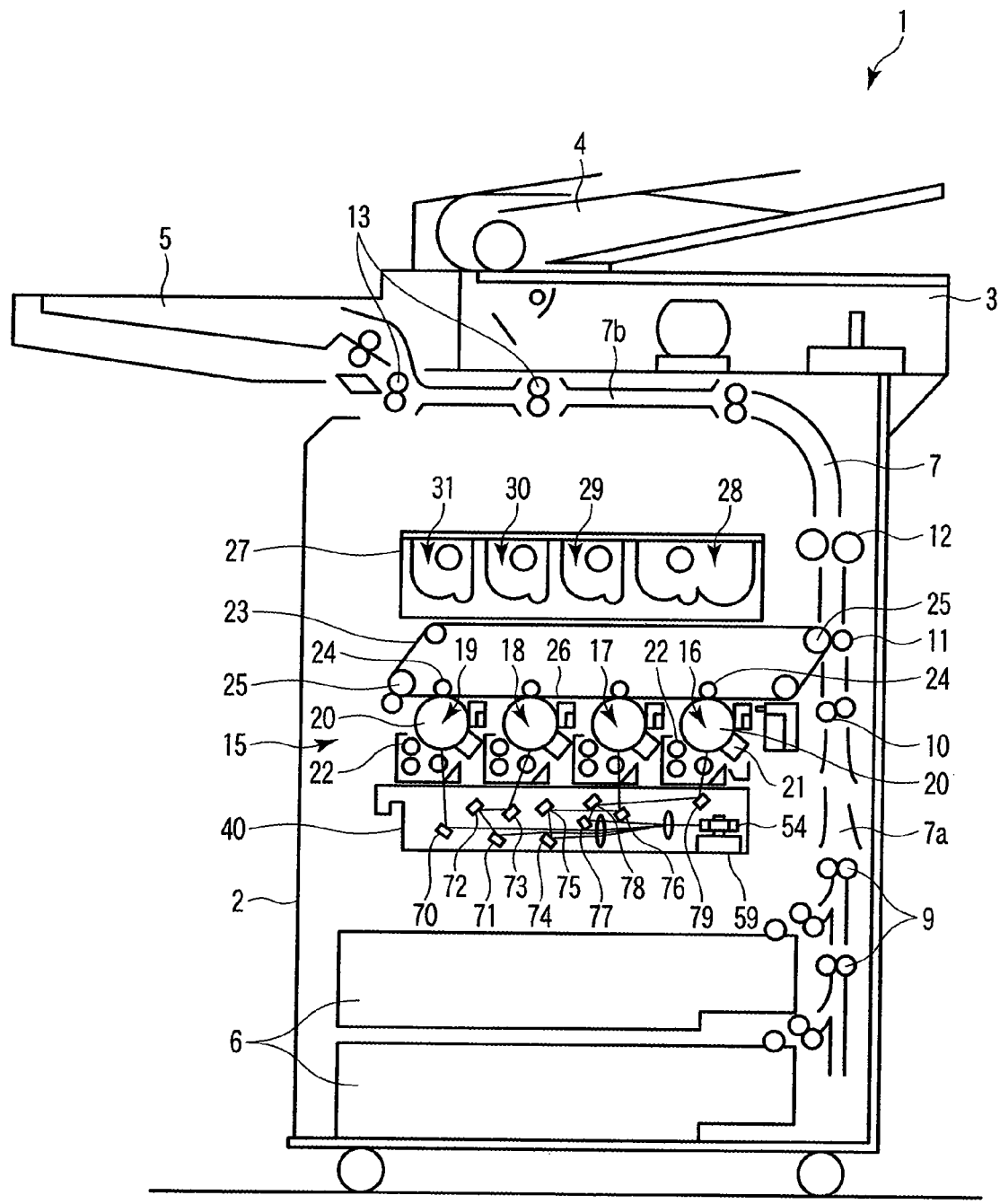
FIG. 1 is a side view schematically showing the inside of an image forming apparatus according to a first embodiment of the present invention.

FIG. 1 is a diagram schematically showing an image forming apparatus 1 such as a quadruple tandem color copying machine. The image forming apparatus 1 includes an apparatus main body 2. A scanner 3, an auto document feeder 4, and a sheet discharging tray 5 are provided above an apparatus main body 2. The scanner 3 optically scans image information such as characters from an original.

Plural sheet feeding cassettes 6 are provided below the apparatus main body 2. The sheet feeding cassettes 6 are connected to the sheet discharging tray 5 via a conveying path 7. The conveying path 7 guides sheets stored in the sheet feeding cassettes 6 to the sheet discharging tray 5 one by one. The conveying path 7 has a first path 7a and a second path 7b. The first path 7a extends upward from the sheet feeding cassettes 6. The second path 7b extends horizontally from an upper end of the first path 7a toward the sheet discharging tray 5. Plural sheet feeding rollers 9, registration rollers 10, a transfer roller 11, and a fixing device 12 are provided in order from below in the first path 7a. Plural sheet discharging rollers 13 are provided in the second path 7b.

As shown in FIG. 1, an image forming unit 15 is provided in the middle stage of the apparatus main body 2. The image forming unit 15 includes a first image forming unit 16 for forming a black image, a second image forming unit 17 for forming a cyan image, a third image forming unit 18 for forming a magenta image, and a fourth image forming unit 19 for forming a yellow image. The first to fourth image forming units 16 to 19 are horizontally arranged in a row along a width direction of the apparatus main body 2.

Each of the first to fourth image forming units 16 to 19 includes a photoconductive drum 20, a charging device 21, a developing device 22, and an intermediate transfer roller 24. The charging device 21 uniformly charges an outer peripheral surface of the photoconductive drum 20. The developing device 22 develops, using a toner, an electrostatic latent image formed on the outer peripheral surface of the photoconductive drum 20. The intermediate transfer roller 24 transfers a toner image on the photoconductive drum 20 onto an intermediate transfer belt 23. The charging device 21, the developing device 22, and the intermediate transfer roller 24 are arranged around the photoconductive drum 20.

The intermediate transfer belt 23 is wound in an endless shape among plural rollers 25. The intermediate transfer belt 23 is provided above the first to fourth image forming units 16 to 19. The intermediate transfer belt 23 has a horizontal traveling section 26. The horizontal traveling section 26 moves along a direction in which the first and fourth image forming units 16 to 19 are arranged. The horizontal traveling section 26 passes between the photoconductive drum 20 of each of the first to fourth image forming units 16 to 19 and the intermediate transfer roller 24. The intermediate transfer belt 23 is pressed against the transfer roller 11 on the conveying path 7 via one roller 25.

As shown in FIG. 1, a cartridge housing unit 27 is provided above the intermediate transfer belt 23. First to fourth toner cartridges 28, 29, 30, and 31 are housed in the cartridge housing unit 27. The first toner cartridge 28 supplies a black toner to the developing device 22 of the first image forming unit 16. The second toner cartridge 29 supplies a cyan toner to the developing device 22 of the second image forming unit 17. The third toner cartridge 30 supplies a magenta toner to the developing device 22 of the third image forming unit 18. The fourth toner cartridge 31 supplies a yellow toner to the developing device 22 of the fourth image forming unit 19.

An exposing device (a laser unit) 40 is provided below the first to fourth image forming units 16 to 19. The exposing device 40 irradiates laser beams corresponding to image information on the respective photoconductive drums 20 of the first to fourth image forming units 16 to 19. Electrostatic latent images corresponding to colors, which should be developed, are formed on the respective photoconductive drums 20 of the first to fourth image forming units 16 to 19 by the laser beams. Details of the exposing device 40 are explained in detail later.

The electrostatic latent images formed on the respective photoconductive drums 20 of the first to fourth image forming units 16 to 19 are developed as toner images with the toners of the respective colors by the developing devices 22. The toner images of the four colors visualized in this way are sequentially transferred onto the intermediate transfer belt 23 via the intermediate transfer rollers 24 to be superimposed on the intermediate transfer belt 23.

A sheet is fed from one sheet feeding cassette 6 to the first path 7a of the conveying path 7. The sheet is guided to the position of the intermediate transfer belt 23 via the registration rollers 10. The toner images of the four colors superimposed on the intermediate transfer belt 23 are transferred onto the sheet via the transfer roller 11 as a color image. The color image transferred onto the sheet is fixed on the sheet by the fixing device 12. The sheet having the color image fixed thereon is guided to the sheet discharging tray 5 through the second path 7b of the conveying path 7.

Figure 2:
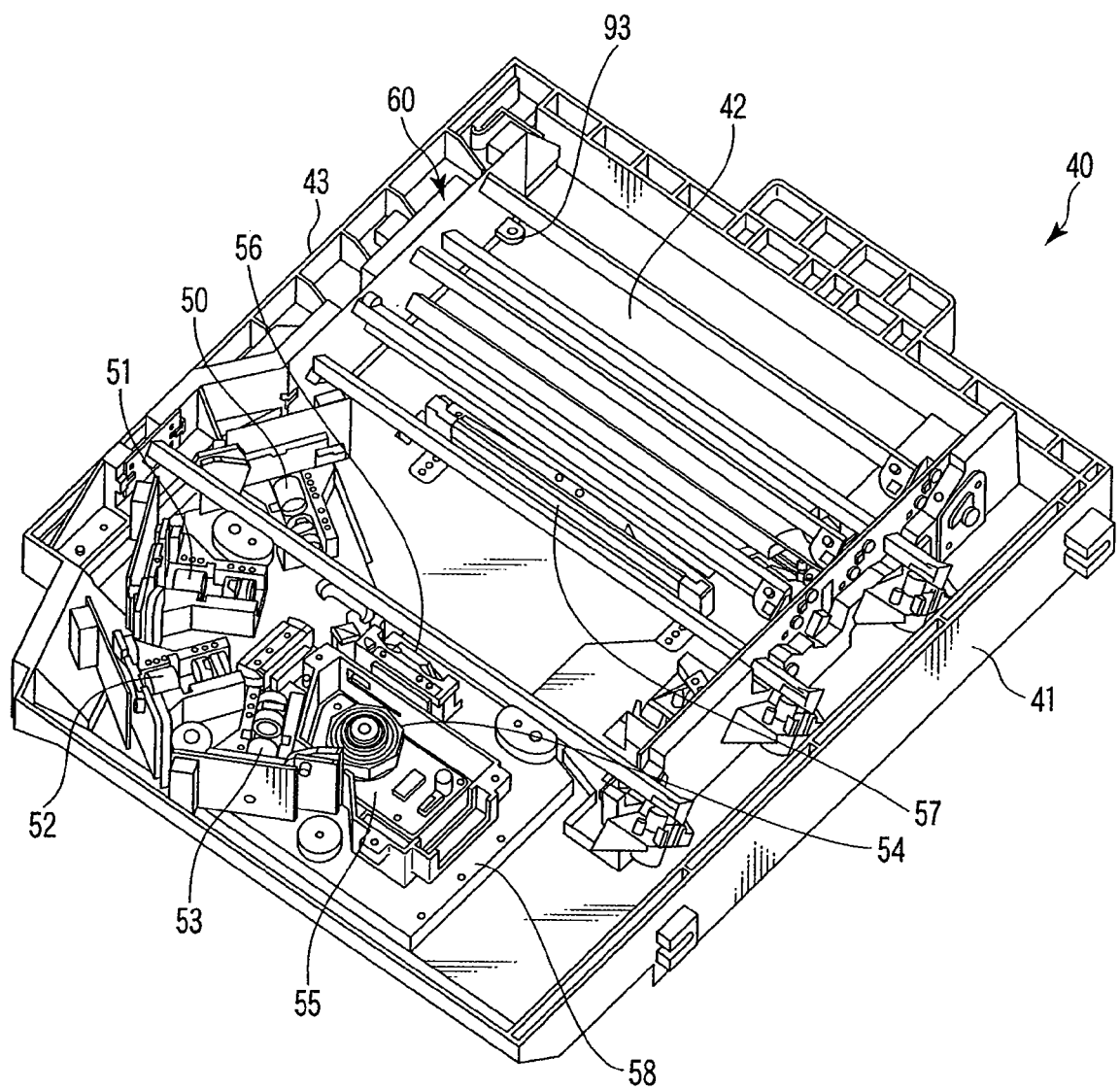
FIG. 2 is a perspective view of an exposing device of the image forming apparatus shown in FIG. 1.

The exposing device 40 is shown in FIG. 2. The exposing device 40 includes a casing 41. The casing 41 includes a bottom section 42 and a sidewall section 43 rising from a peripheral edge of the bottom section 42 and is integrally molded with synthetic resin. An example of a material of the casing 41 is ABS resin (acrylonitrile butadiene styrene resin) reinforced by glass fiber or modified PPE (modified-Polyphenylene ether). An upper opening of the casing 41 is covered by a not-shown cover member. The "casing of synthetic resin" in this specification is a concept including not only a casing made of only synthetic resin but also a casing made of FRP (fiber reinforced plastic) and a casing formed by embedding insert fittings in resin.

In the casing 41, light sources 50, 51, 52, and 53, a polygon mirror mechanism 55 including a polygon mirror 54, a first deflection lens 56, a second deflection lens 57, and a mirror unit 60 are housed. The light sources 50 to 53 respectively include laser diodes that output image lights (laser beams) subjected to color separation toward the polygon mirror 54. The light sources 50 to 53, the polygon mirror mechanism 55, and the first deflection lens 56 are mounted on a common base 58 of metal such as an aluminum alloy. The polygon mirror 54 is rotated by a polygon motor 59 (shown in FIG. 1).

Figure 3:
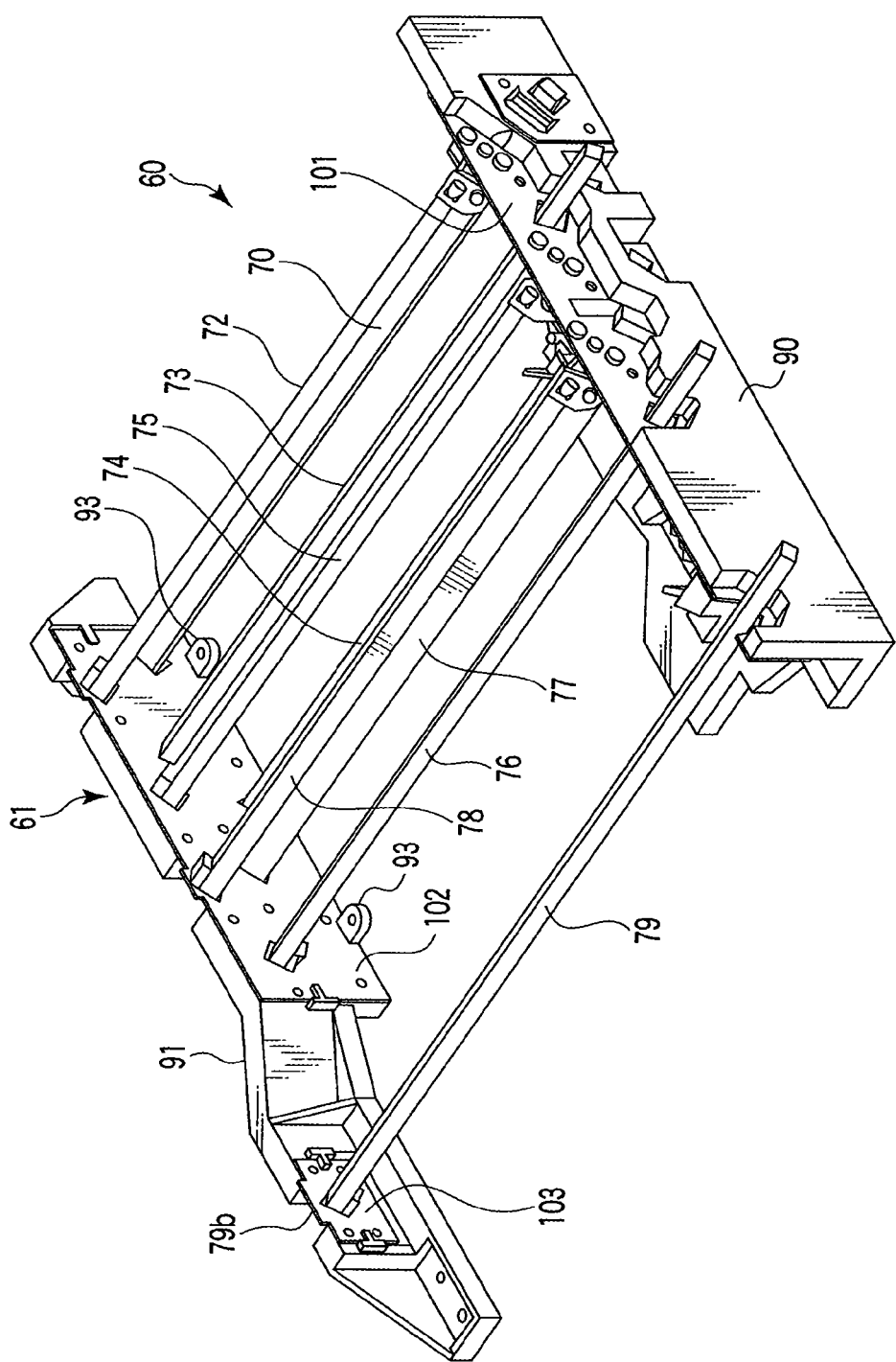
FIG. 3 is a perspective view of a mirror unit of the exposing device shown in FIG. 2.

The mirror unit 60 is shown in FIG. 3. The mirror unit 60 includes a frame structure 61 of metal and mirrors 70 to 79 held in predetermined positions by the frame structure 61. The mirrors 70 to 79 reflect image lights corresponding to respective colors (e.g., yellow, magenta, cyan, and black). For example, the mirror 70 reflects a laser beam for yellow, the mirrors 71, 72, and 73 reflect a laser beam for magenta, the mirrors 74, 75, and 76 reflect a laser beam for cyan, and the mirrors 77, 78, and 79 reflect a laser beam for black. All of the mirrors 70 to 79 are formed in a bar shape. The mirrors 70 to 75 are provided in positions distant from the polygon mirror 54. The mirrors 76 to 79 are provided in positions close to the polygon mirror 54.

One mirror 78 is shown in FIGS. 4 to 8 as a representative of the mirrors 70 to 79. The mirror 78 has an axis X (shown in FIGS. 4 and 5) along a longitudinal direction thereof. A section perpendicular to the axis X of the mirror 78 is square or rectangular. As shown in FIG. 10, a body 80 of the mirror 78 has four surfaces 81, 82, 83, and 84. A reflection layer 85 is formed on the first surface 81 by aluminum deposition. The reflection layer 85 extends in a direction along the axis X. The second and third surfaces 82 and 83 are perpendicular to the first surface 81. The fourth surface 84 is located on the rear side of the reflection layer 85. The first surface 81 and the fourth surface 84 are parallel to each other. The other mirrors 70 to 77 and 79 are configured in the same manner as the mirror 78.

The frame structure 61 of the mirror unit 60 shown in FIG. 3 includes a pair of base members 90 and 91 made of, for example, an aluminum alloy. The base members 90 and 91 are formed in predetermined shapes, respectively, by casting metal such as an aluminum alloy. As an example, the base members 90 and 91 are made of aluminum alloy die-casts. The base members 90 and 91 are arranged to be opposed to each other. Plural attaching sections 93 (a part of which is shown in FIGS. 2 and 3) are provided in lower parts of the base members 90 and 91. The attaching sections 93 are fixed to the bottom section 42 of the casing 41 by fixing members (not shown) such as bolts.

As shown in FIG. 3, a first mirror supporting plate 101 is attached to a surface on an inner side of one base member 90. A second mirror supporting plate 102 and a third mirror supporting plate 103 are attached to a surface on an inner side of the other base member 91. The first mirror supporting plate 101 and the second mirror supporting plate 102 are arranged parallel to each other. The mirror supporting plates 101, 102, and 103 are formed by flat plates of metal having fixed thickness, respectively. The surfaces of the base members 90 and 91, to which the mirror supporting plates 101, 102, and 103 are attached, are precisely finished by machining such that the mirror supporting plates 101, 102, and 103 can be accurately fixed in predetermined positions.

The mirror supporting plates 101, 102, and 103 are fixed to the base members 90 and 91 by fixing members such as screws. An example of a material of the mirror supporting plates 101, 102, and 103 is a steel plate having fixed thickness. Holes for mirror supporting sections 70a, 71a, 72a, 73a, 74a, 75a, 76a, 77a, 78a, and 79a are formed in the first mirror supporting plate 101. Holes for mirror supporting sections 70b, 71b, 72b, 73b, 74b, 75b, 76b, 77b, and 78b are formed in the second mirror supporting plate 102. A hole for a mirror supporting section 79b is formed in the third mirror supporting plate 103 (shown in FIG. 3).

One ends in an axis X direction of the mirrors 70 to 79 are respectively supported by the mirror supporting sections 70a to 79a provided in the first mirror supporting plate 101. The other ends of the mirrors 70 to 78 are respectively supported by the mirror supporting sections 70b to 78b provided in the second mirror supporting plate 102. The other end of the mirror 79 is supported by the mirror supporting section 79b provided in the third mirror supporting plate 103.

The mirror supporting sections 78a and 78b for supporting the mirror 78 shown in FIGS. 4 to 8 are explained below as representatives of the mirror supporting sections described above. As shown in FIG. 11, a circular first hole 110, arcuate pair of second holes 111 and 112, and a circular jig inserting hole 113 are formed in the mirror supporting section 78a. The arcuate second holes 111 and 112 are formed along an arc with the first hole 110 as the center. These holes 110, 111, 112, and 113 pierce through the mirror supporting plate 101 in a thickness direction thereof.

A holder member 120 is provided in the mirror supporting section 78a. A flat spring 121 functioning as a spring member is attached to the holder member 120. The flat spring in this specification is a spring formed in a predetermined shape by bending a thin plate made of spring steel and is synonymous with plate-worked spring. As shown in FIG. 10, the flat spring 121 includes a first elastic piece 122 that comes into contact with the fourth surface 84 of the mirror 78 and a second elastic piece 123 that comes into contact with the third surface 83 of the mirror 78. Holes 124 and 125 are formed in the flat spring 121.

As shown in FIGS. 9 and 10, the holder member 120 includes a cylindrical boss 130, screw holes 131 and 132, a long hole 133, a pair of first positioning protrusions 134 functioning as positioning sections, a second positioning protrusion 135 functioning as a positioning section, and a projection 136. The holder member 120 is an integral molding of synthetic resin. As shown in FIG. 11, the boss 130 is formed in a position corresponding to the hole 110 formed in the mirror supporting plate 101. The screw holes 131 and 132 are formed in positions corresponding to the arcuate holes 111 and 112. The long holes 133 are formed in a position corresponding to the jig inserting hole 113. The long hole 133 extends in a radial direction of the boss 130. The long hole 133 functions as an eccentric pin bearing.

The boss 130 is inserted into the circular hole 110 formed in the mirror supporting plate 101. Therefore, the holder member 120 can rotate around the axis X of the mirror 78 with the boss 130 as the center. Holder fixing screws 140 and 141 functioning as fixing members are screwed into the screw holes 131 and 132. The holder fixing screws 140 and 141 are inserted into the arcuate holes 111 and 112 formed in the mirror supporting plate 101.

Figure 12:
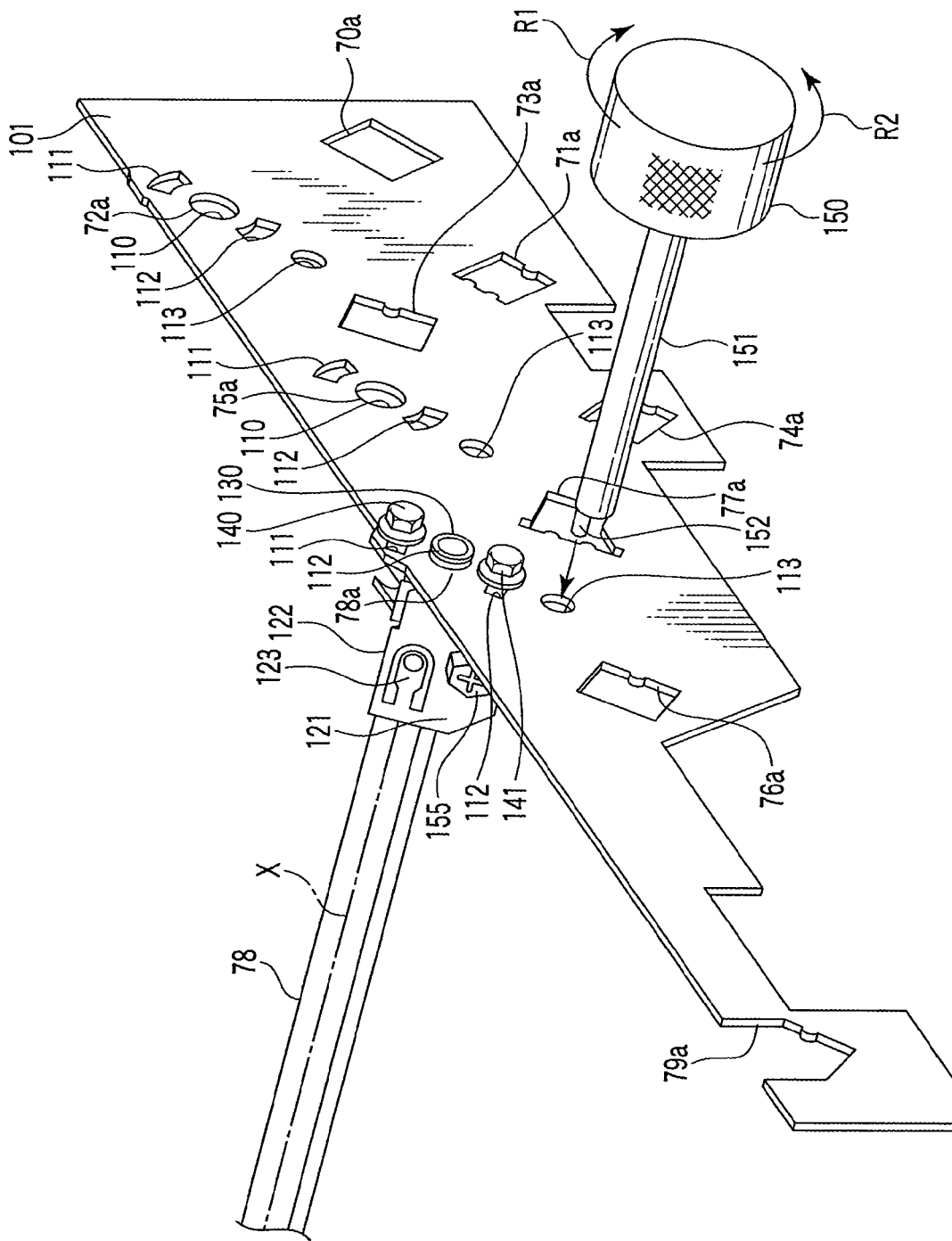
FIG. 12 is a perspective view of the mirror supporting section shown in FIG. 4 and an adjusting jig.

An example of an adjusting jig 150 is shown in FIG. 12. The adjusting jig 150 includes a columnar shaft 151 and an eccentric pin 152 formed at a distal end of the shaft 151. The eccentric pin 152 is provided in a position shifting from the center of the shaft 151. Therefore, when the shaft 151 is rotated, the eccentric pin 152 eccentrically rotates. The end of the shaft 151 can be inserted into the jig inserting hole 113. The eccentric pin 152 can be inserted into the long hole 133.

The flat spring 121 is fixed to the holder member 120 by a screw 155. As shown in FIG. 10, the screw 155 is inserted into the hole 124 of the flat spring 121. The screw 155 is screwed into a screw hole 137 of the holder member 120. The projection 136 of the holder member 120 is inserted into the hole 125 formed in the flat spring 121. One end of the mirror 78 is held between the holder member 120 and the flat spring 121. The flat spring 121 is fixed to the holder member 120 by the screw 155. In this state, the mirror 78 is urged toward the first positioning protrusions 134 by the elasticity of the first elastic piece 122. The first surface 81 of the mirror 78 comes into contact with the first positioning protrusions 134. The mirror 78 is urged toward the second positioning protrusion 135 by the elasticity of the second elastic piece 123. The second surface 82 of the mirror 78 comes into contact with the second positioning protrusion 135. In this way, one end of the mirror 78 is held in a predetermined position of the holder member 120.

Figure 4:
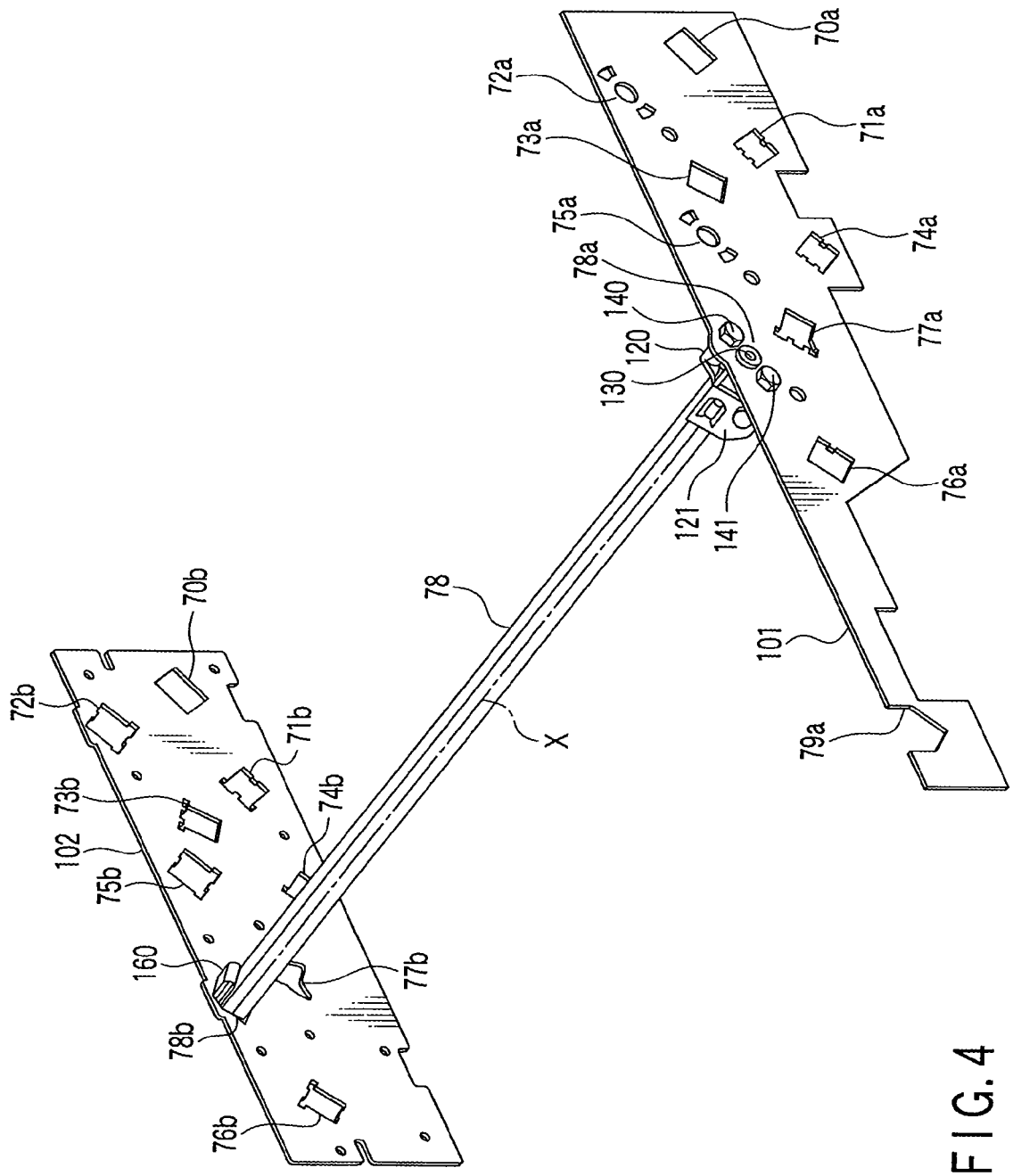
FIG. 4 is a perspective view of a mirror and a mirror supporting plate of the exposing device shown in FIG. 2 viewed from one side.
Figure 6:
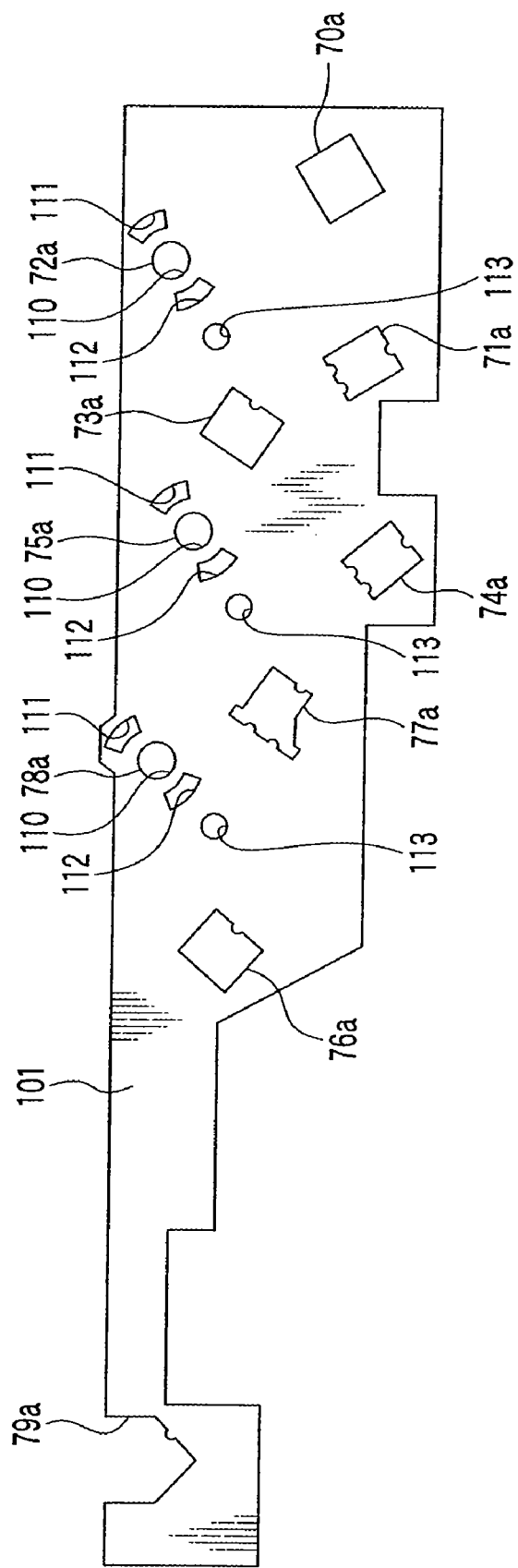
FIG. 6 is a side view of the mirror supporting plate shown in FIG. 4.
Figure 7:
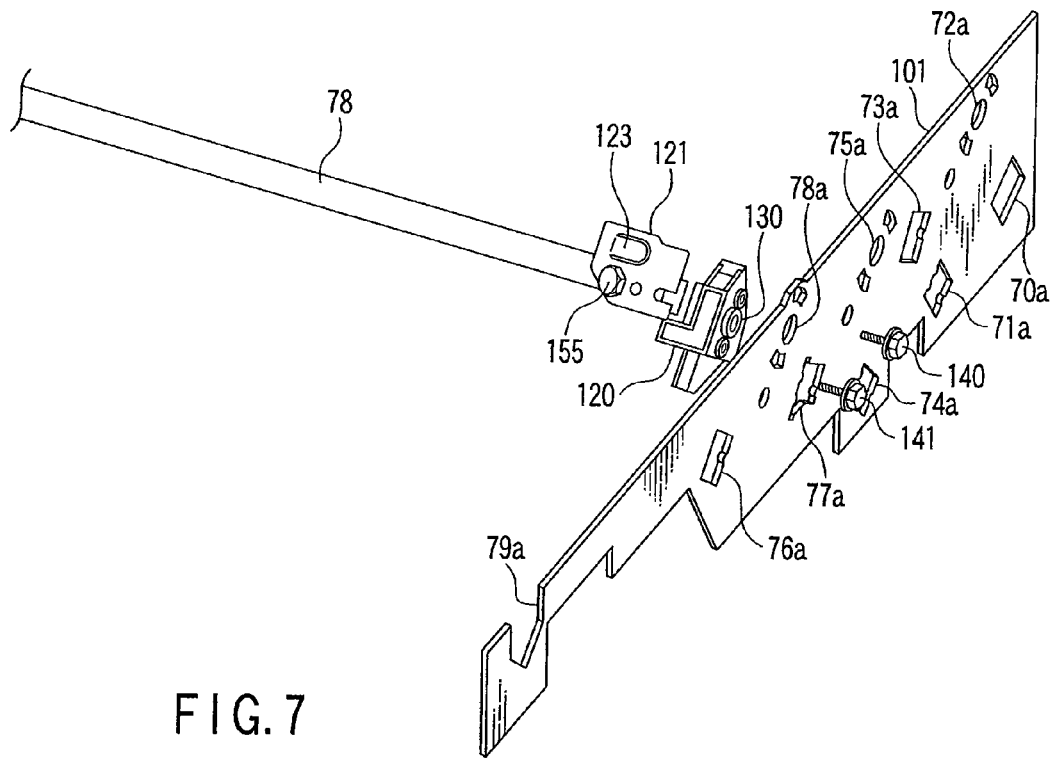
FIG. 7 is a perspective view of the mirror supporting plate shown in FIG. 6 viewed from one side.
Figure 8:
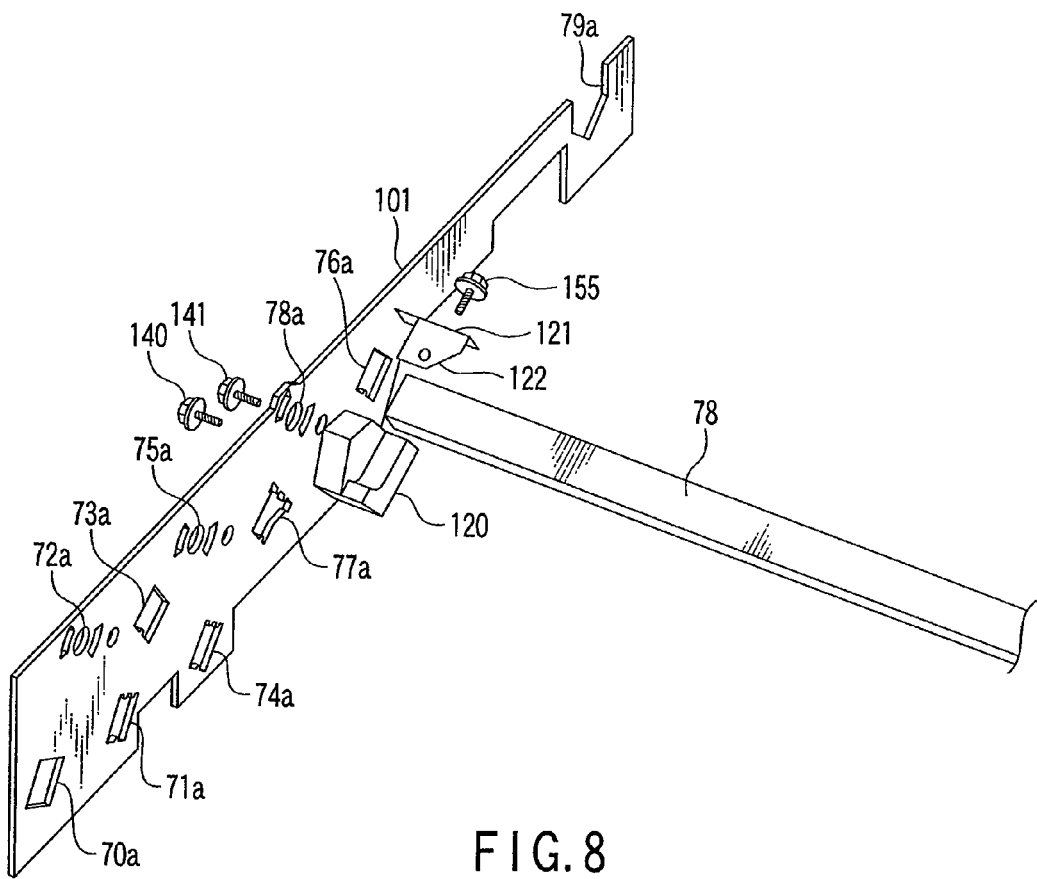
FIG. 8 is a perspective view of the mirror supporting plate shown in FIG. 6 viewed from the other side.

The second mirror supporting plate 102 is shown in FIGS. 4 and 5. The other end in the axis X direction of the mirror 78 is fixed to the mirror supporting section 78b by a flat spring 160 provided in the second mirror supporting plate 102. The flat spring 160 elastically supports the other end of the mirror 78 such that the mirror 78 can rotate a certain degree of angle around the axis X.

The holder fixing screws 140 and 141 are loosened when an angle of the mirror 78 is adjusted. This allows the holder member 120 to rotate with the boss 130 as the center. In this state, as shown in FIG. 12, the end of the shaft 151 of the adjusting jig 150 is inserted into the jig inserting hole 113. The eccentric pin 152 is engaged in the long hole 133 by inserting the eccentric pin 152 into the long hole 133 of the holder member 120.

The eccentric pin 152 is eccentrically rotated by rotating the adjusting jig 150 in a first direction R1 or a second direction R2. Consequently, the holder member 120 rotates around the axis X with the boss 130 as the center. When the holder member 120 rotates, the mirror 78 rotates together with the holder member 120 in the same direction as the holder member 120. The other end of the mirror 78 is elastically held by the flat spring 160. Therefore, the flat spring 160 bends according to the rotation of the mirror 78. This allows the mirror 78 to rotate.

After the angle of the mirror 78 is adjusted, the adjusting jig 150 is pulled out from the jig inserting hole 113 and the long hole 133. The holder member 120 is fixed to the mirror supporting plate 101 by rotating the holder fixing screws 140 and 141 in a direction for tightening the same in the mirror supporting plate 101 (clockwise direction). In this way, the adjustment of the angle of the mirror 78 is performed by the adjusting jig 150. The holder fixing screws 140 and 141 are used to fix the holder member 120 to the mirror supporting plate 101. In other words, with the exposing device 40 according to this embodiment, a screw member for adjusting the angle of the mirror 78 is unnecessary. Therefore, an unnecessary screw member is prevented from being left in the mirror supporting section 78a after the adjustment.

According to the embodiment explained above, it is possible to fix the end of the mirror 78 to the holder member 120 with fixed holding power by the flat spring 121. When the angle of the mirror 78 is adjusted, the elasticity of the flat spring 121 does not change. In other words, it is possible to rotate the holder member 120 in a desired direction by a desired amount using the adjusting jig 150 regardless of the elasticity of the flat spring 121. Even if the holder member 120 rotates, the elasticity of the flat spring 121 does not change. This allows the flat spring 121 to always display fixed holding power regardless of the angle of the mirror 78. Therefore, it is possible to always stably hold the end of the mirror 78 with fixed power. The mirror supporting sections 72a and 75a other than the mirror supporting section 78a are configured in the same manner as the mirror supporting section 78a.

The mirrors 70 to 79 are supported in the casing 41 by the base members 90 and 91 made of an aluminum alloy having high thermal conductivity via the mirror supporting plates 101, 102, and 103 of metal. Since the base members 90 and 91 made of aluminum die-casts have large rigidity and are resistible against vibration, it is possible to surely hold the mirrors 70 to 79. Since the base members 90 and 91 made of an aluminum alloy have high heat radiation properties and a large heat capacity, it is possible to equally transfer heat to the respective mirror supporting sections 70a to 79a and 70b to 79b. Therefore, it is possible to suppress a specific mirror supporting section from becoming hot and prevent the relative positions of the mirrors 70 to 79 from shifting because of a thermal expansion difference. This makes it possible to prevent color drift.

In this embodiment, the mirror supporting sections 70a to 79a and 70b to 79b are formed in the simple-shaped mirror supporting plates 101, 102, and 103 formed by metal flat plates. In this case, since holes only have to be opened in the mirror supporting plates 101, 102, and 103 formed by flat plates by pressing, it is possible to improve accuracy of relative positions, shapes of the holes, and the like of the mirror supporting sections 70a to 79a and 70b to 79b. Therefore, even if shape accuracy of the base members 90 and 91 made of die-casts is relatively low, it is possible to support the mirrors 70 to 79 in accurate positions with the mirror supporting plates 101, 102, and 103. In the base members 90 and 91, only the surfaces to which the mirror supporting plates 101, 102, and 103 are attached have to be highly accurately machined. This makes manufacturing of the base members 90 and 91 easy and makes it possible to manufacture the same at low cost. It is possible to provide the mirror supporting plates 101, 102, and 103 at low cost by pressing the same.

Figure 13:
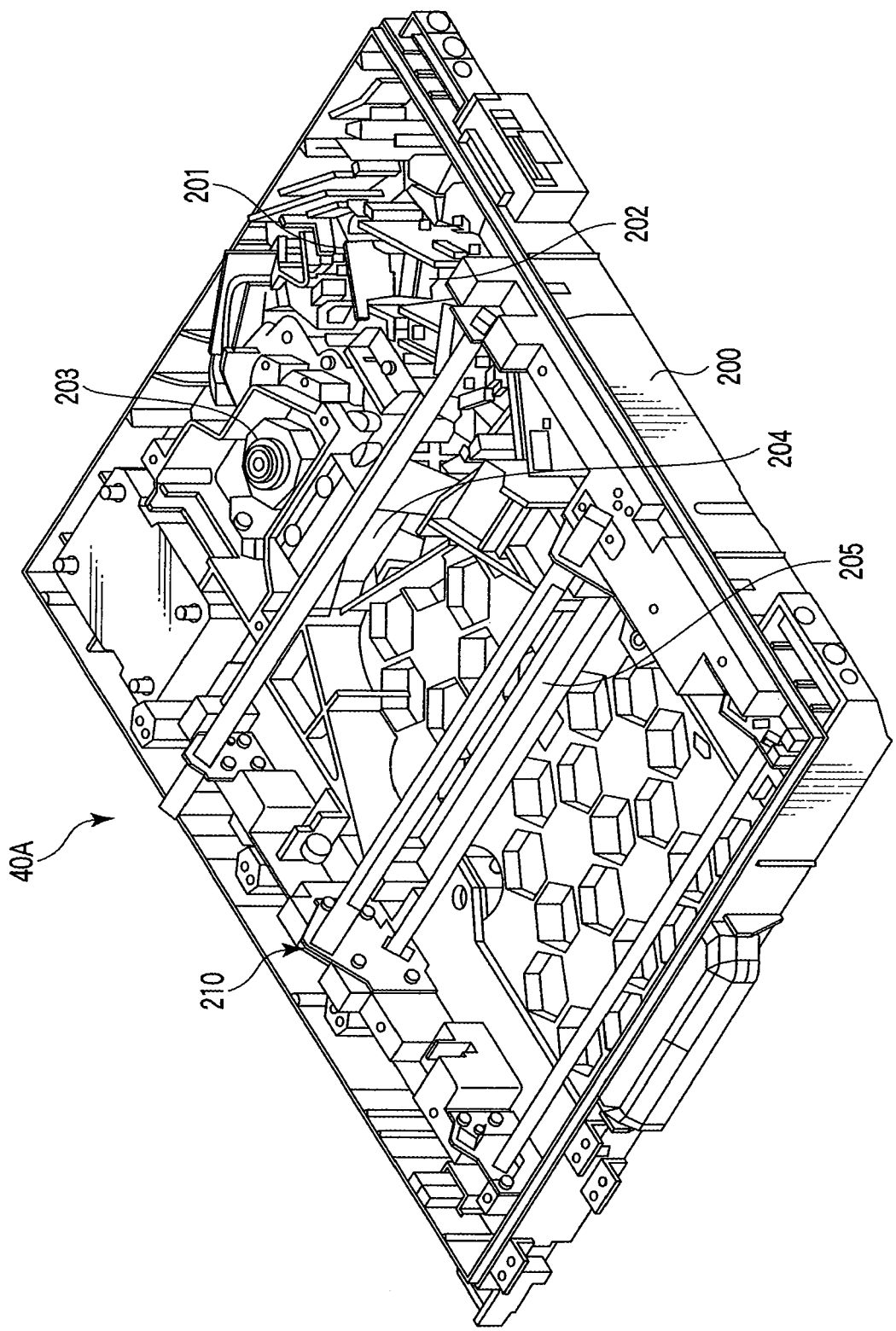
FIG. 13 is a perspective view of an exposing device according to a second embodiment of the present invention.
Figure 14:
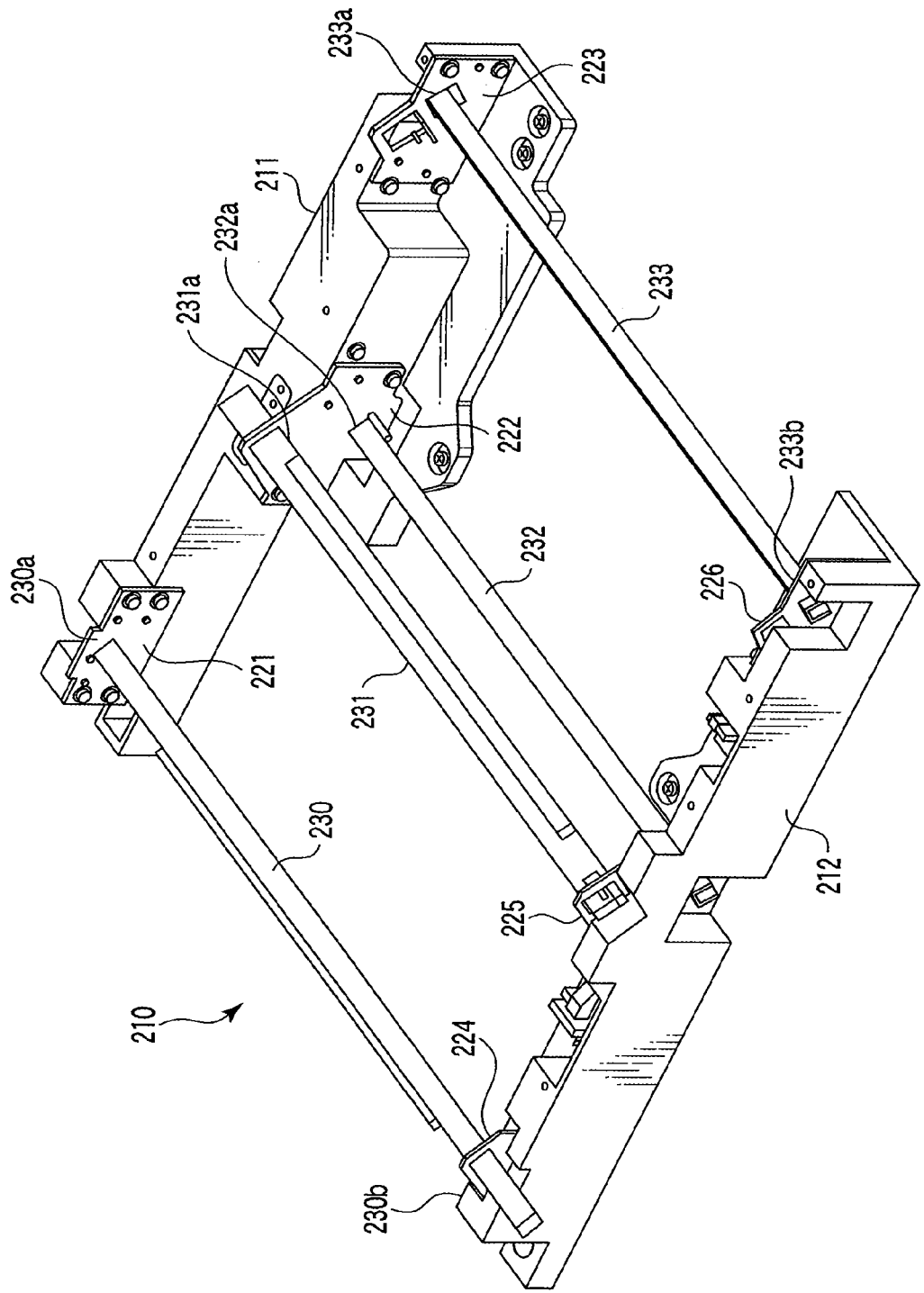
FIG. 14 is a perspective view of a mirror unit of the exposing device shown in FIG. 13 viewed from one side.

FIGS. 13 to 15 disclose an exposing device 40A according to a second embodiment of the present invention. The exposing device 40A has a casing 200 of synthetic resin. In the casing 200, light sources 201 and 202, a polygon mirror mechanism 203, a first deflection lens 204, a second deflection lens 205, a mirror unit 210, and the like are housed.

The mirror unit 210 is shown in FIGS. 14 and 15. The mirror unit 210 includes a pair of base members 211 and 212 made of die-casts, mirror supporting plates 221, 222, and 223 formed by flat plates attached to one base member 211, mirror supporting plates 224, 225, and 226 formed by flat plates attached to the other base member 212, and mirrors 230, 231, 232, and 233. The base members 211 and 212 are made of a material having thermal conductivity higher than that of the casing 200, for example, metal such as an aluminum alloy. The mirror supporting plates 221 to 226 are also made of metal.

One end of the mirror 230 is supported by a mirror supporting section 230a provided in the mirror supporting plate 221. The other end of the mirror 230 is supported by a mirror supporting section 230b provided in the mirror supporting plate 224. One ends of the mirrors 231 and 232 are respectively supported by mirror supporting sections 231a and 232a provided in the mirror supporting plate 222. The other ends of the mirrors 231 and 232 are respectively supported by mirror supporting sections 231b and 232b provided in the mirror supporting plate 225. One end of the mirror 233 is supported by a mirror supporting section 233a provided in the mirror supporting plate 223. The other end of the mirror 233 is supported by a mirror supporting section 233b provided in the mirror supporting plate 226.

In the exposing device 40A according to this embodiment, as in the exposing device 40, the mirrors 230 to 233 are supported by the base members 211 and 212 having high thermal conductivity via the mirror supporting plates 221 to 226 formed by flat plates. Therefore, it is possible to suppress a thermal expansion difference from occurring among the supporting sections for the mirrors 230 to 233 and reduce problems due to shift of positions of beams. Since it is easy to highly accurately machine the mirror supporting plates 221 to 226 formed by flat plates, even if machining accuracy of the base members 211 and 212 is low, it is possible to highly accurately attach the mirrors 230 to 233 in predetermined positions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exposing device comprising:
a casing;
a mirror housed in the casing;
a base member fixed to the casing;
a mirror supporting plate that is attached to the base member and has a mirror supporting section configured to support an end of the mirror, the mirror supporting plate having a first hole and an arcuate second hole with the first hole arranged at a center of an arc defined by the arcuate second hole;
a holder member that is attached to the mirror supporting section of the mirror supporting plate, the holder member having a boss which is inserted into the first hole, the holder member being rotatable with the boss as a center around an axis of the mirror, the holder member further having a screw hole formed at a position corresponding to the arcuate second hole;
a spring member that is attached to the holder member and holds the end of the mirror; and
a fixing member inserted into the screw hole and configured to fix the holder member to the mirror supporting plate.

2. The device according to claim 1, wherein a jig inserting hole into which an adjusting jig can be inserted is formed in the mirror supporting plate, and
   a long hole that extends in a radial direction of the boss and into which an eccentric pin of the adjusting jig can be inserted is formed in the holder member.

3. The device according to claim 1, wherein the holder member includes:
   a first positioning section that comes into contact with a first surface of the mirror; and
   a second positioning section that comes into contact with a second surface perpendicular to the first surface of the mirror.

4. The device according to claim 3, wherein
   the spring member is a flat spring; and
   the flat spring includes:
      a first elastic piece that urges the end of the mirror toward the first positioning section; and
      a second elastic piece that urges the end of the mirror toward the second positioning section.

5. The device according to claim 1, wherein
   another base member is arranged to be opposed to the base member in the casing,
   another mirror supporting plate is attached to the other base member,
   another mirror supporting section is provided in the other mirror supporting plate, and
   a spring member that elastically holds the other end of the mirror is provided in the other mirror supporting section.

6. The device according to claim 1, wherein
   the casing is made of synthetic resin, and
   the base member and the mirror supporting plate are made of metal.

7. The device according to claim 6, wherein the base member is made of a die-cast of an aluminum alloy.

8. The device according to claim 6, wherein the mirror supporting plate is formed by a metal flat plate having a fixed thickness.

9. An image forming apparatus comprising:
   an image forming unit having a developing device; and
   an exposing device that outputs light toward a photoconductive member of the image forming unit, wherein the exposing device includes:
      a casing;
      plural mirrors housed in the casing;
      a pair of base members of metal fixed to the casing;
      a first mirror supporting plate of metal that is attached to one base member of the pair of base members and has one mirror supporting section configured to support one end of the mirror, the first mirror supporting plate having a first hole and an arcuate second hole with the first hole arranged at a center of an arc defined by the arcuate second hole;
      a second mirror supporting plate of metal that is attached to the other base member and has the other mirror supporting section configured to support the other end of the mirror;
      a holder member that is attached to the mirror supporting section of the first mirror supporting plate, the holder member having a boss which is inserted into the first hole, the holder member being rotatable with the boss as a center around an axis of the mirror, the holder member further having a screw hole formed at a position corresponding to the arcuate second hole;
      a spring member that is attached to the holder member and holds the end of the mirror; and
      a fixing member inserted into the screw hole and configured to fix the holder member to the first mirror supporting plate.

10. The apparatus according to claim 9, wherein the holder member includes:
    a first positioning section that comes into contact with a first surface of the mirror; and
    a second positioning section that comes into contact with a second surface perpendicular to the first surface of the mirror.

11. The apparatus according to claim 10, wherein
    the spring member is a flat spring; and
    the flat spring includes:
       a first elastic piece that urges the end of the mirror toward the first positioning section; and
       a second elastic piece that urges the end of the mirror toward the second positioning section.

12. The apparatus according to claim 9, wherein
    a light source and a polygon mirror are housed in the casing,
    one ends of a mirror in a position distant from the polygon mirror and another mirror in a position close to the polygon mirror are supported by the first mirror supporting plate, and
    the other ends of the mirror in the position distant from the polygon mirror and the another mirror in the position close to the polygon mirror are supported by the second mirror supporting plate.

13. The apparatus according to claim 9, wherein the pair of base members are made of die-casts of an aluminum alloy, respectively.

14. The apparatus according to claim 9, wherein the first mirror supporting plate and the second mirror supporting plate are formed by metal flat plates having a fixed thickness, respectively.

15. An exposing device comprising:
    a casing;
    a mirror housed in the casing;
    a base member fixed to the casing;
    a mirror supporting plate that is attached to the base member and has a mirror supporting section configured to support an end of the mirror, the mirror supporting plate having a first hole and a jig inserting hole into which an adjusting jig can be inserted;
    a holder member that is attached to the mirror supporting section of the mirror supporting plate, the holder member having a boss which is inserted into the first hole, the holder member being rotatable with the boss as a center around an axis of the mirror, the holder member further having a long hole that extends in a radial direction of the boss and into which an eccentric pin of the adjusting jig can be inserted;
    a spring member that is attached to the holder member and holds the end of the mirror; and
    a fixing member configured to fix the holder member to the mirror supporting plate.

16. A method configured to adjust an angle of a mirror housed in the casing of the exposing device according to claim 15, the method comprising:
    providing the holder member rotatable around the axis of the mirror in the mirror supporting section in the casing;
    holding an end of the mirror in the holder member using the spring member;
    inserting a shaft of the adjusting jig into the jig inserting hole of the mirror supporting section and engaging the eccentric pin at a distal end of the shaft with an eccentric pin bearing of the holder member;

rotating the shaft of the adjusting jig in a first direction or a second direction and eccentrically rotating the eccentric pin to thereby rotate the holder member in a desired direction and rotate the mirror around the axis;

pulling out the adjusting jig from the jig inserting hole after adjusting the angle of the mirror; and fixing the holder member to the mirror supporting section using a fixing member.

17. The device according to claim 15, wherein the holder member includes:

a first positioning section that comes into contact with a first surface of the mirror; and a second positioning section that comes into contact with a second surface perpendicular to the first surface of the mirror.

18. The device according to claim 17, wherein
the spring member is a flat spring; and
the flat spring includes:
    a first elastic piece that urges the end of the mirror toward the first positioning section; and
    a second elastic piece that urges the end of the mirror toward the second positioning section.

19. The device according to claim 15, wherein
another base member is arranged to be opposed to the base member in the casing,
another mirror supporting plate is attached to the other base member,
another mirror supporting section is provided in the other mirror supporting plate, and
a spring member that elastically holds the other end of the mirror is provided in the other mirror supporting section.

20. The device according to claim 15, wherein
the casing is made of synthetic resin, and
the base member and the mirror supporting plate are made of metal.

21. The device according to claim 20, wherein the base member is made of a die-cast of an aluminum alloy.

22. The device according to claim 20, wherein the mirror supporting plate is formed by a metal flat plate having a fixed thickness.

23. An image forming apparatus comprising:
an image forming unit having a developing device; and
an exposing device that outputs light toward a photoconductive member of the image forming unit, wherein the exposing device includes:
    a casing;
    plural mirrors housed in the casing;
    a pair of base members of metal fixed to the casing;
    a first mirror supporting plate of metal that is attached to one base member of the pair of base members and has one mirror supporting section configured to support one end of the mirror, the first mirror supporting plate having a first hole and a jig inserting hole into which an adjusting jig can be inserted
    a second mirror supporting plate of metal that is attached to the other base member and has the other mirror supporting section configured to support the other end of the mirror;
    a holder member that is attached to the mirror supporting section of the first mirror supporting plate, the holder member having a boss which is inserted into the first hole, the holder member being rotatable with the boss as a center around an axis of the mirror, the holder member further having a long hole that extends in a radial direction of the boss and into which an eccentric pin of the adjusting jig can be inserted;
    a spring member that is attached to the holder member and holds the end of the mirror; and
    a fixing member configured to fix the holder member to the first mirror supporting plate.

24. The apparatus according to claim 23, wherein the holder member includes:
a first positioning section that comes into contact with a first surface of the mirror; and
a second positioning section that comes into contact with a second surface perpendicular to the first surface of the mirror.

25. The apparatus according to claim 24, wherein
the spring member is a flat spring; and
the flat spring includes:
    a first elastic piece that urges the end of the mirror toward the first positioning section; and
    a second elastic piece that urges the end of the mirror toward the second positioning section.

26. The apparatus according to claim 23, wherein
a light source and a polygon mirror are housed in the casing,
one ends of a mirror in a position distant from the polygon mirror and another mirror in a position close to the polygon mirror are supported by the first mirror supporting plate, and
the other ends of the mirror in the position distant from the polygon mirror and the another mirror in the position close to the polygon mirror are supported by the second mirror supporting plate.

27. The apparatus according to claim 23, wherein the pair of base members are made of die-casts of an aluminum alloy, respectively.

28. The apparatus according to claim 23, wherein the first mirror supporting plate and the second mirror supporting plate are formed by metal flat plates having a fixed thickness, respectively.

* * * * *